United States Patent [19]

Yamagishi et al.

[11] Patent Number: 4,832,461
[45] Date of Patent: May 23, 1989

[54] PROJECTION-TYPE MULTI-COLOR LIQUID CRYSTAL DISPLAY DEVICE

[75] Inventors: Yasuo Yamagishi, Zama; Akihiro Mochizuki, Atsugi; Masayuki Iwasaki, Zama; Toshiaki Yoshihara; Fumiyo Onda, both of Kawasaki, all of Japan

[73] Assignee: Fujitsu Limited, Kawasaki, Japan

[21] Appl. No.: 86,803

[22] Filed: Aug. 19, 1987

[30] Foreign Application Priority Data

Aug. 20, 1986 [JP] Japan ............................... 61-194617
Dec. 12, 1986 [JP] Japan ............................... 61-294931

[51] Int. Cl.[4] ...................... G02F 1/133; G03B 21/00
[52] U.S. Cl. ............................... 350/347 E; 350/346; 353/120; 353/122
[58] Field of Search ......................... 350/346, 347 E; 353/120, 121, 122

[56] References Cited

U.S. PATENT DOCUMENTS

| | | | |
|---|---|---|---|
| 3,833,287 | 9/1974 | Taylor et al. | 350/349 |
| 3,915,554 | 10/1975 | Maezawa | 350/347 E |
| 4,278,328 | 7/1981 | Mukoh et al. | 350/346 |
| 4,435,912 | 3/1984 | Adrian et al. | 350/452 |
| 4,582,396 | 4/1986 | Bos et al. | 350/347 E |
| 4,613,207 | 9/1986 | Fergason | 350/331 R |
| 4,652,101 | 3/1987 | Grunwald | 353/65 |
| 4,671,634 | 6/1987 | Kizaki et al. | 353/38 |
| 4,722,593 | 2/1988 | Shimazaki | 353/122 |
| 4,756,604 | 7/1988 | Nakatsuka et al. | 350/334 |
| 4,770,525 | 9/1988 | Umeda et al. | 353/122 |

FOREIGN PATENT DOCUMENTS 0134657 10/1979 Japan ............................... 350/346

OTHER PUBLICATIONS

C. Tani et al—"13.3/9:50 A.M.: Storage-Type Liquid Crystal Matrix Display," May 1979, SID Digest, pp. 114–115.

F. R. Jenkins et al, *Fundamentals of Optics*, 4th edition, McGraw Hill, New York, 1976, pp. 60–63.

E. P. Raynes, "Cholesteric Texture and Phase Change Effects", (*Non–Emissive Electrooptic Displays*, ed. Knetz et al, Plenum Press, New York, 1976), pp. 25–43.

F. J. Kahn "Electric-Field-Induced Color Changes and Pitch Dilation in Cholesteric Liquid Crystals"(-Physical Review Letters, vol. 24, No. 5, Feb. 2, 1970, pp. 209–212).

H. Kogelnik "Coupled Wave Theory for Thick Hologram Gratings", (The Bell System Technical Journal, vol. 48, No. 9, Nov. 1969, pp. 2909–2947).

J. E. Adams, et al "Optical Properties of Certain Cholesteric Liquid-Crystal Films" (The Journal of Chemical Physics, vol. 50, No. 6, Mar. 15, 1969, pp. 2458–2464).

*Primary Examiner*—Stanley D. Miller
*Assistant Examiner*—Anita E. Pellman
*Attorney, Agent, or Firm*—Staas & Halsey

[57] ABSTRACT

A bright and large information capacity projection-type multi-color liquid crystal display is realized by a display device which includes a liquid crystal panel having a plurality of layers of cholesteric-nematic phase transition type liquid crystals having a positive dielectric anisotropy and phase transition hysterisis when a voltage is applied. The liquid crystals are driven to be in homeotropic and focalconic textures which are maintained when at a certain voltage is applied thereto. A desired color of the projected display can be obtained by selecting a thickness of the liquid crystal layer and a refractive index anisotropy of the liquid crystal of the liquid crystal layers.

8 Claims, 5 Drawing Sheets

PROJECTION-TYPE MULTI-COLOR LIQUID CRYSTAL DISPLAY DEVICE

BACKGROUND OF THE INVENTION

1. Field of the Invention

The present invention relates to a projection-type multi-color liquid crystal display device.

2. Description of the Related Art

A projection-type display using a liquid crystal, in which a display is performed by a transmission and scattering of light, is distinguishable over the TN (twisted nematic) type liquid crystal display or the ferroelectric liquid crystal display in that a bright display that can be easily seen is obtained because a polarizing plate can be omitted. As the liquid crystal display method of this type, there are known a laser heat writing method using a smectic A phase liquid crystal and a method using a phase transition type liquid crystal as previously proposed by the present inventors. When a phase transition type liquid crystal is used, since the voltage hysteresis in the phase transition between the cholesteric phase and the nematic phase is utilized, a large-information display is possible with a simple matrix structure ("New Nematic-Cholesteric LCD Using Hysteresis Behavior", SID 1985; U.S. patent application Ser. No. 06/832,897, filed on Feb. 26, 1986).

The principle of a display using a phase transition type liquid crystal will now be described in detail with reference to FIG. 1. In FIG. 1, the applied voltage is plotted on the abscissa and the non-scattering transmission, that is, the ratio of the quantity of light transmitted through the liquid crystal phase without scattering, is plotted on the ordinate. When the voltage is low, the liquid crystal is in the cholesteric phase (focalconic texture and light is scattered outwardly of a projecting image-forming lens, and therefore, a dark zone is formed on the screen. When the voltage is high, the liquid crystal is in the nematic phase (homeotropic texture) and light is incident on the image-forming lens without scattering, and a bright zone is formed on the screen. Since the phase transition voltage upon elevation of the voltage is different from the phase transition voltage upon a drop in the voltage, a certain kind of hysteresis occurs. This hysteresis is utilized in the above-mentioned phase transition type liquid crystal. Namely, an alternating current voltage of 2 Vd is first applied to render the entire liquid crystal transparent. In this state, the voltage is then reduced to Vd to write transparent image elements, and the phase of the voltage applied to upper and lower electrodes is deviated by one pulse and reduced to 0 of the field intensity to write opacity image elements. Then, a voltage of Vd is held to keep the display. In the conventional direct-vision TN type liquid crystal, a color display method is known in which RGB (red-green-blue) filters are used and a displayed image is provided by light from a background light source. Also in the projection-type display system using a phase transition type liquid crystal, colorization is effected according to the same principle. However, if RGB filters are used, the quantity of projected light is reduced to less than ⅓ and a projected image is dimmed by external light. Therefore, only a display having a low contrast is obtained. Moreover, the resolution is also reduced by ⅓.

It is possible to perform a color display by mixing a plurality of light fluxes, which have passed through a plurality of liquid crystal panels, by using a dichromatic mirror. In this case, however, the size of the apparatus is increased and the apparatus becomes expensive. Accordingly, a projection-type color display has not been practically utilized.

Color display devices using a cholesteric-nematic phase transition type liquid crystal are known, although these are direct vision type devices, not projection type (see Japanese Unexamined Patent Publication (Kokai) Nos. 59-116614, 59-116680, 52-133781, 61-32801, 60-29091, 57-201218, 59-18925, 57-124712 and 57-111514 and F. J. Kahn "ELECTRIC-FIELD-INDUCED COLOR CHANGES AND PITCH DILATION IN CHOLESTERIC LIQUID CRYSTALS"(PHYSICAL REVIEW LETTERS Vol. 24, No. 5, Feb. 2, 1970, pp 209–212)). Moreover, the principles of coloring for these color display devices are different from that in a multi-color display device according to the present invention.

SUMMARY OF THE INVENTION

It is a primary object of the present invention to provide a projection-type liquid crystal multi-color display device in which a plurality of colors can be displayed by using a liquid crystal panel having a plurality of liquid crystal layers with wavelength selectivity, a bright display is obtained, and a compact apparatus can be used.

According to the present invention, this object is attained by a projection-type liquid crystal multi-color display device; comprising: a liquid crystal panel having a plurality of layers of cholesteric-nematic phase transition type liquid crystals having a positive dielectric anisotropy and a refractive index anisotropy, each of the layers having a layer thickness, the liquid crystals being in, depending on an applied electrical voltage history, either of homeotropic and focalconic textures when a certain electrical voltage is applied to the liquid crystal layer, the liquid crystal layers being able to form an image composed of homeotropic and focalconic textures by selectively applying different electrical voltage histories and then maintaining said certain electrical voltage at the liquid crystal layer, wherein the refractive index anisotropy of the liquid crystal and the layer thickness of each of the liquid crystal layers are selected so that a light transmitted through each liquid crystal layer is brought to a desired color if a light is incident normal to each liquid crystal layer at a portion thereof in the focalconic texture, while a portion of the liquid crystal layers in the homeotropic texture is transparent and a light transmitted thereto is not colored; and an optical system for making a light incident almost normal to the liquid crystal panel and forming a projected image of the image of the homeotropic and focalconic texture in the liquid crystal panel on a screen; whereby a light which has been transmitted through a focalconic texture portion of any of the liquid crystal layers is colored, and thus the projected image is realized as a multi-color image.

DESCRIPTION OF THE PREFERRED EMBODIMENTS

Figure 1:
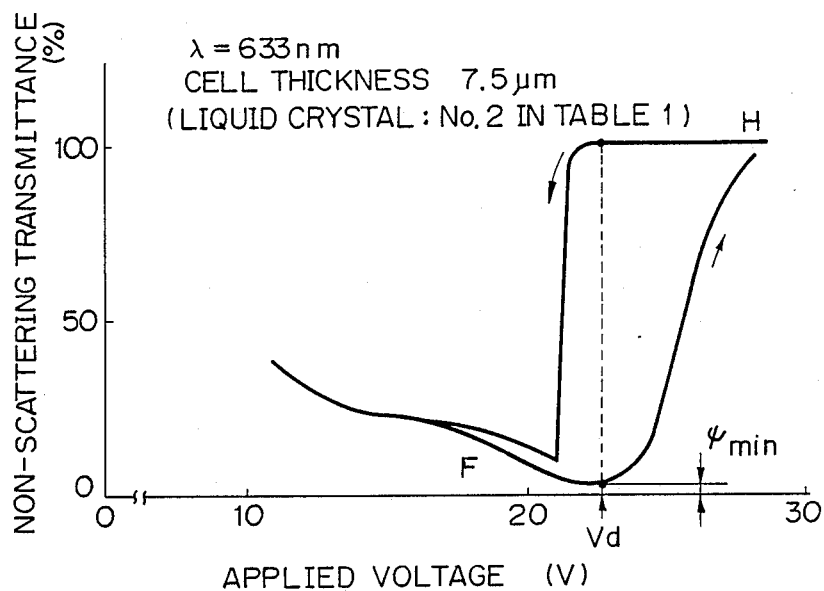
FIG. 1 is a graph showing the non-scattering transmittance of a cholesteric-nematic phase transition type liquid crystal having a positive dielectric anisotropy and phase transition hysterisis, which is used in the present invention, in relation to an applied voltage.

The projection-type multi-color liquid crystal display device according to the present invention is characterized by a liquid crystal panel having a plurality of layers of choresteric-nematic phase transition type liquid crystals having a positive dielectric anisotropy and by differences in the refractive index and/or the layer thickness of the liquid crystal layers (hereinafter also referred to as "cell thickness").

It has been clarified that, in light scattering in the opaque state of a cholesteric-nematic phase transition type liquid crystal having a hysteresis effect, the contribution of light diffraction attributed to the spiral structure of the cholesteric phase is large (Lecture Meeting of Association of Applied Physics held in September 1986, 27aR11). The present invention has been completed based on this finding.

Since liquid crystal molecules have a long structure and an anisotropy of the refractive index, the refractive index of the portion where liquid crystal molecules are arranged vertically to the substrate is different from the refractive index of the portion where liquid crystal molecules are arranged horizontally to the substrate. Accordingly, a modulation of the refractive index corresponding to the spiral pitch exists and a volume phase type diffraction lattice is formed. The diffraction efficiency $\eta$ is expressed by the formula of H. Kogelnic ("Coupled Wave Theory for Thick Hologram Grating", The Bell System Journal, volume 48, pp 2909-2947) at the Bragg angle incidence:

$$\eta_{max} = \sin^2(\pi \delta_n d/2\lambda \cos \theta) \quad (1)$$

In the formula (1), $\delta_n$ stands for the amplitude of the modulation of the refractive index and is smaller than the refractive index anisotropy $\Delta_n$ because of the alignment distribution, etc. In the formula (1), $\lambda$ represents the wavelength and d represents the thickness of the diffraction lattice, which corresponds to the thickness of the cholesteric phase. Furthermore, $\theta$ represents the Bragg angle: $\cos \theta$ being nearly equal to 1 in the case of a cholesteric liquid crystal. In the cholesteric phase, the spiral pitch is dispersed to a certain extent and the direction of the spiral axis is random in a plane, and therefore, light is scattered in concentric circles having a broad angle.

Since scattering includes refractive scattering and diffraction scattering, the efficiency $\Psi$ of a transmission of light without scattering in the scattering layer is generally expressed by the following formula (2):

$$\Psi = (1-\alpha) \times (1-\eta) \quad (2)$$

In the formula (2), $\alpha$ represents the amplitude of the scattering by refraction. In general, light transmitted without being scattered by refraction scattering is exponentially reduced in proportion to the thickness of the scattering layer, and thus is approximated by the following formula (3):

$$1-\alpha = e^{-kd} \quad (3)$$

where k is a scattering constant inherent to the liquid crystal. Accordingly, the following formula (4) is derived by substituting the formulae (1) and (3) for the formula (2):

$$\Psi = e^{-kd} \times \cos^2(\pi \delta_n d/2\lambda) \quad (4)$$

From the formula (4), it is seen that the non-scattering percent transmission is a function of the wavelength $\lambda$. Accordingly, a colored display is possible if non-scattered light is projected by a projection-type optical system. Furthermore, the maximum scattering wavelength can be changed by changing $\delta_n d$, and thus the color of the projected image can be selected. If a plurality of cells differing in the maximum scattering wavelength (a plurality of cells giving different display colors) are piled and projection display is performed through the piled panels, since there is no wavelength dependency of the percent transmission of visible rays in the transparent state, multiple colorization by subtractive mixture becomes possible.

It should be noted that in a projection-type liquid crystal display device according to the present invention, cholesteric-nematic phase transition type liquid crystals are brought to the homeotropic (nematic) and focalconic (cholesteric) textures, and in the focalconic texture, the liquid crystal molecules are aligned such that the spiral axes of the molecules are in parallel to the panel. Thus, a light is incident normal to the spiral axes of the molecules and scattering with a wavelength selectivity occurs. This phenomena, that scattering with a wavelength selectivity occurs when a light is incident normal to the spiral axes of cholesteric liquid crystal molecules, had not been known until the present invention. In contrast, it was known that reflection with a wavelength selectivity occurs if a light is incident parallel to the spiral axes of cholesteric-type liquid crystal molecules (see F. J. Kahn's paper, ibid.). In Japanese Unexamined Patent Publication Nos. 59-116614 and 52-133781 (ibid.), a cholesteric liquid crystal layer is used as a color filter, but the cholesteric-type liquid crystal layers are in a granduan texture, i.e., the spiral axes of the liquid crystal molecules are aligned perpendicular to the liquid crystal panel or the substrates. In these known scattering with a wavelength selectivity, the wavelength of the scattering light does not depend on the cell thickness and highly depends on the incident angle. In contrast, in the method of the present invention, the wavelength or the hue of the transmitting light or the displayed color depends only slightly on the incident angle and remarkably depends on the cell thickness.

From the formula (4), it is seen that, for the displayed color to be clear, the refraction scattering having a small wavelength dependency must be decreased. Namely, the cell thickness or the layer thickness of the liquid crystal layer (d is a value obtained by subtracting the thickness of the anchoring layer in the interface of the substrate from the cell thickness) must be reduced.

If the cell thickness is increased, the brightness or saturation of a displayed color is reduced and the display becomes dark. Although it is difficult to define the allowable limit for the tint, the cell thickness must be smaller than 15 μm, preferably smaller than 10 μm.

A dichromatic dye can be used for obtaining a clearer coloration. The principle of coloration of the dichromatic dye is the same as in a guest-host type liquid crystal. However, if an impurity such as a dye is added, the width of the hysteresis to the voltage is generally decreased, and thus an addition of only a small amount of the dye is permissible. Moreover, since the liquid crystal molecule has a spiral structure in the cholesteric phase, the probability of the horizontal (or vertical) arrangement of the dye molecule to the substrate is ½. Accordingly, a good coloration cannot be obtained by only a dichromatic dye. Of more importance is the fact that, since the dye is decomposed or discolored by strong light, the life of the dye is too short in a projection-type display system in which a liquid crystal layer is irradiated with a strong light.

In the present invention, since the diffraction scattering attributed to the focalconic texture (cholesteric phase) structure is utilized for a color display, any mixture of a nematic liquid crystal and a cholesteric liquid crystal can be used, so long as the mixed liquid crystal has a positive dielectric anisotropy and a hysteresis effect in the cholesteric-nematic phase transition when a voltage is applied. However, from a practical viewpoint, preferably the hysteresis effect is large and the voltage necessary for driving is low. As the cholesteric liquid crystal satisfying this requirement, a chiral nematic liquid crystal can be effectively used. In the mixed liquid crystal of the present invention, the ratio (weight ratio) of the nematic liquid crystal to the cholesteric liquid crystal, that is, the nematic liquid crystal/chiral nematic liquid crystal weight ratio, is from 93/7 to 75/25. Of course, the present invention is not limited by this appropriate range. Such preferred liquid crystals are described, for example, in U.S. patent application Ser. No. 06/832,897 filed Feb. 20, 1986 and references indicated therein, the descriptions of which are incorporated herein by reference.

Figure 2:
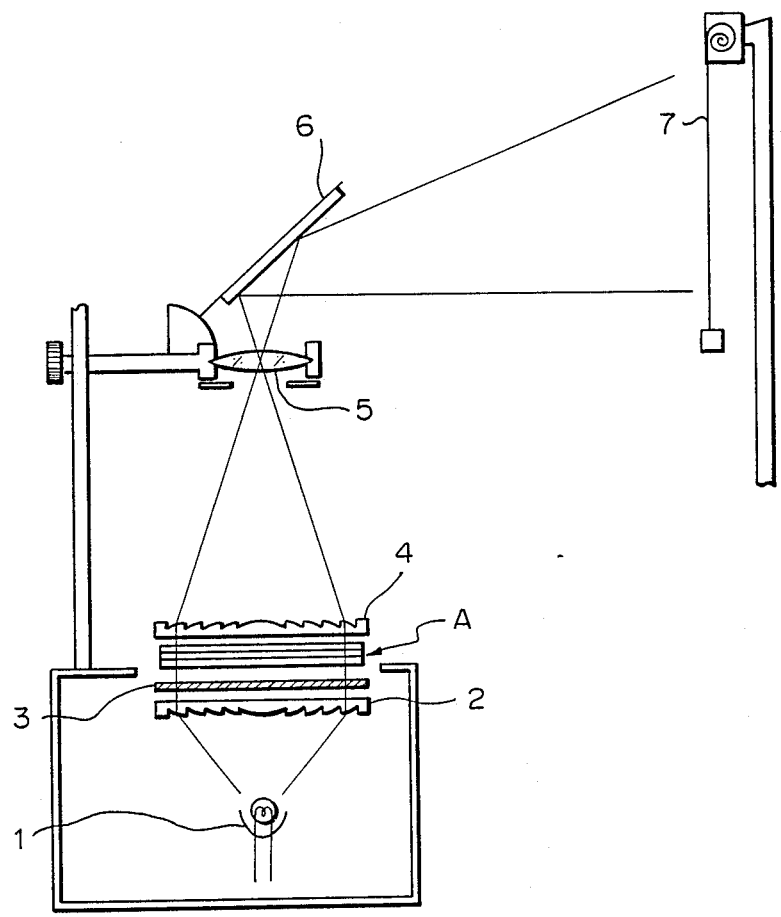
FIG. 2 is a sectional view of a projection-type multi-color liquid crystal display device according to the present invention.

FIG. 2 illustrates an example of a projection-type multi-color liquid crystal display device according to the present invention. In FIG. 2, reference A denotes a liquid crystal panel having a plurality of liquid crystal layers, a light source 1, a first convex Fresnel lens 2 for converting a light from the light source 1 to parallel light incident normal to the panel A, an ultraviolet-cutting filter 3, a second convex Fresnel lens 4 for condensing the transmitted parallel light toward a lens 5, the lens 5 thereby forming an image, a reflection board 6, and a screen 7.

Figure 3:
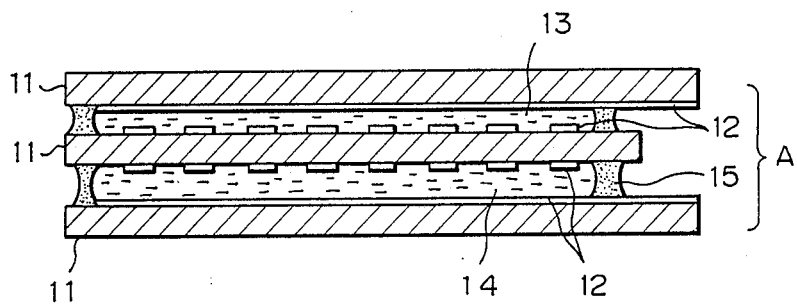
FIG. 3 is an enlarged sectional view of a liquid crystal panel of the device in FIG. 2.

FIG. 3 illustrates an example of the liquid crystal panel A, in which 11 denotes transparent substrates, 12 transparent electrodes, 13 a first liquid crystal, 14 a second liquid crystal, and 15 a sealant. The liquid crystals 13 and 14 are separately driven. Normally, all of the substrates 11 are transparent, but the outermost substrate may be opaque and reflective when the liquid crystal panel is of the reflection type.

Figure 4:
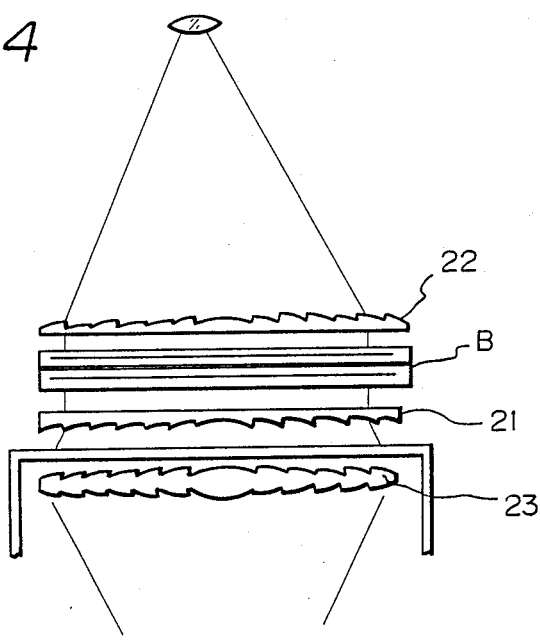
FIG. 4 is a sectional view of another example of a display device according to the present invention.
Figure 5A:
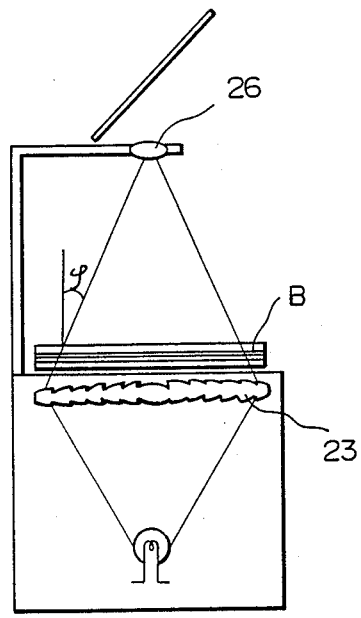
FIG. 5A is a sectional view of an overhead projection (OHP)
Figure 5B:
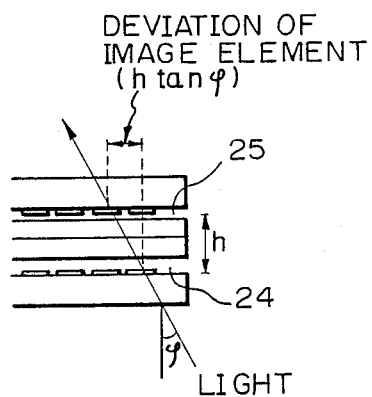
FIG. 5B is an enlarged partial sectional view of a liquid crystal panel in FIG. 5A.
Figure 6A:
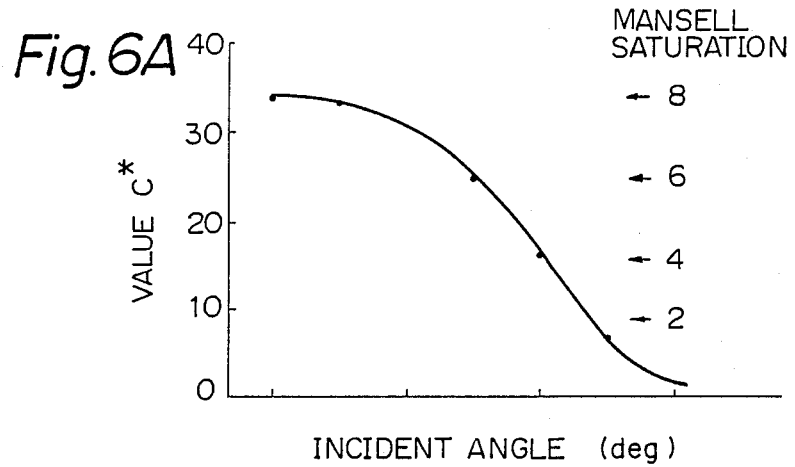
FIGS. 6A to 6C are graphs showing the saturation, hue, and brightness, respectively, of a projected color in relation to the incident angle; and, FIG. 7 is a graph showing the minimum transmittance of a liquid crystal in relation to the thickness of the liquid crystal layer in the example.
Figure 6B:
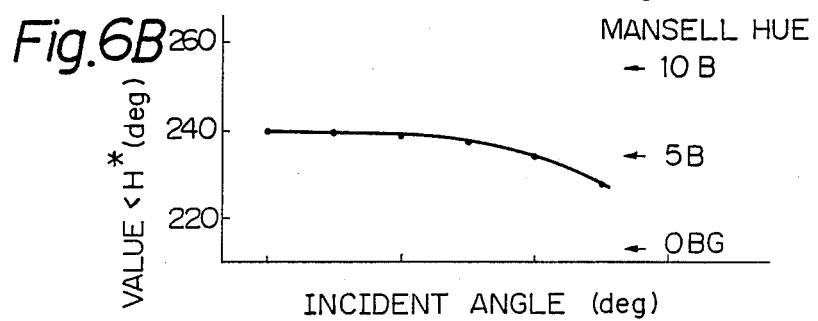
Figure 6C:
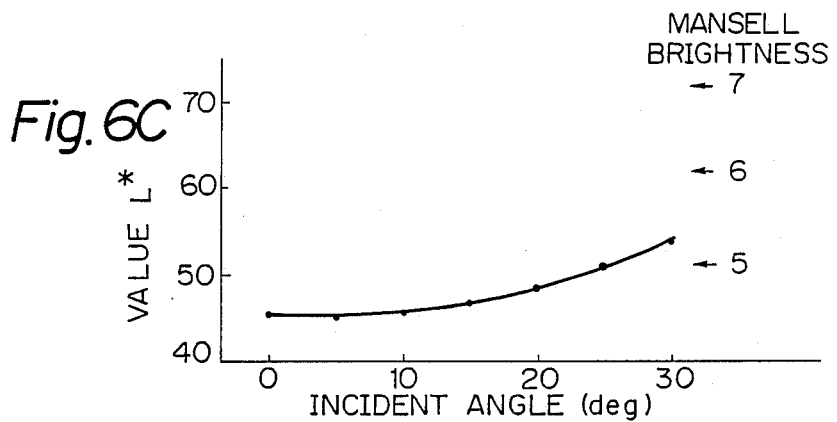

FIG. 4 is another example of a projection type multi-color liquid crystal display device, which is intended for use in connection with a commercially sold overhead projector (OHP). In this display device, the liquid crystal panel B is sandwiched between a concave Fresnel lens 21 and a convex Fresnel lens 22. These Fresnel lenses have, for example, a size of about 300×300. This is because, if a liquid crystal panel is placed on an OHP (a size of, e.g., about 300×300), the incident light is not normal to the panel, as seen in FIGS. 5A and 5B. If the incident angle is expressed by $\Psi$ and a distance from one liquid crystal layer 24 to another liquid crystal layer 25 is expressed by h, a deviation of an image element becomes h·tan $\Psi$. As h is usually 2 mm and $\Psi$ is about 30° at largest, the deviation becomes about 1.2 mm, which means that, in a panel having image elements at 3 line/mm, the deviation corresponds to 3 to 4 lines and an overlap of displayed images is inevitable. Further, the color is dull at the periphery of the panel. In the liquid crystal display device, since the colored display is made by diffraction scattering, the transmitted light is affected by the incident angle. FIGS. 6A to 6C show the features of the projected color in relation to the incident angle when the projected color is blue; where the refractive index anisotropy $\Delta_n$ of the liquid crystal is 0.157, the spiral pitch of the liquid crystal (granduan state) is 1.10 μm, and the thickness of the liquid crystal layer (cell thickness) is 5.7 μm. Among the saturation, the brightness, and the hue, the saturation is particularly reduced with an increase of the incident angle. These problems are solved by converting a convergent light from an OHP to a parallel light, through a concave Fresnel lens 21. The distance from the convex Fresnel lens 23 of general OHP's to the image forming lens (a diameter of 40 to 50φ) 26 is about 340 to 380 mm, depending on the specific OHP. Therefore, when the focal length of the concave Fresnel lens 21 is defined as about 360 mm, a parallel light which causes no problem in practice is obtained. Thus, a deviation of the image elements and a reduction of the purity of a color are prevented.

According to the present invention, since a liquid crystal panel is constructed by laminating phase transition type liquid crystal layers so that an inherent light-scattering effect of each liquid crystal layer is utilized, a multi-color display becomes possible and a projection type display device having a small size and a bright display can be provided. When used at a conference or for a public display, the only portion to which attention should be paid is colored, and therefore, four colors are sufficient in practice. More colors can be displayed by increasing the number of liquid crystal layers.

The projection-type display using a cholesteric-nematic phase transition-type liquid crystal having a positive dielectric anisotropy and a phase transition hysterisis to voltage, in which cholesteric phase (focalconic texture) and nematic phase (homeotropic texture) can be kept at a same certain voltage is advantageous in that this allows a quickly switchable, bright and large information display. Also, according to the present invention, a multi-color display is made possible by such an advantageous display method.

Now, the present invention is described with reference to examples.

Cell Thickness Dependency of Non-Scattering Percent Transmission

Three phase transition type liquid crystals as shown in Table 1 were obtained by mixing a liquid crystal mixture composed mainly of ethane type, bicyclohexane type and ester type liquid crystals as the nematic liquid crystal and a chiral nematic liquid crystal having two asymmetric carbon atoms as the cholesteric liquid crystal, at a temperature higher than the isotropic phase transition temperature. Then, liquid crystal No. 2 was filled in panels having different cell thicknesses (the thickness of the liquid crystal layer), and the relationship between the cell thickness and the light scattering efficiency (non-scattering percent transmission) was determined by using an He-Ne laser (633 nm) and an Ar laser (476 nm).

Figure 7:
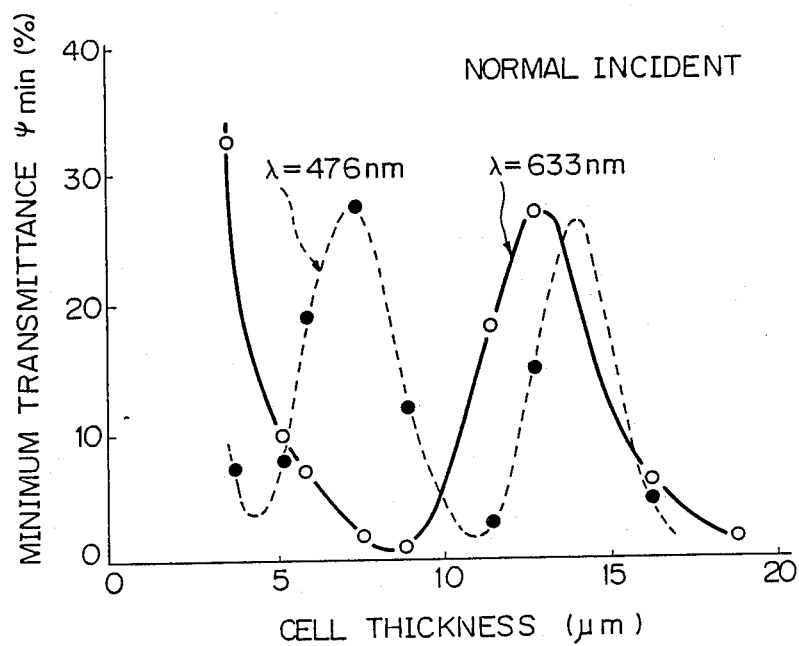

FIG. 7 shows the relationship between the cell thickness and the non-scattering percent transmittance $\Psi_{min}$, observed when the liquid crystal No. 2 shown in Table 1 was used. Note, $\Psi_{min}$ represents the ratio of the quantity of non-scattering transmitted light in the cholesteric state under the application of a memory driving voltage Vd to the quantity of non-scattering transmitted light in the nematic state under the application of Vd. From FIG. 7, it can be seen that $\Psi_{min}$ periodically changes with an increase of the cell thickness and the frequency of the change is short when the wavelength is short, and it is proved that the formula (4) of scattering determined while taking the diffraction into consideration is fully proven.

Change of Projected Display Color by $\Delta_n \cdot d$

The liquid crystals No. 1, No. 2, and No. 3 shown in Table 1 were filled into three panels spaced by glass fibers having different diameters, respectively, and the colors of projected images were observed by using a commercially available transmission type overhead projector.

The projected colors of nine kinds of liquid crystals are shown in Table 2. From Table 2, it is seen that as $\Delta_n$ of the cell thickness is increased, the displayed color is changed in the spectrum of orange → (thin) russet → reddish violet → violet → bluish violet → blue → cyan.

TABLE 1

| Items | Phase Transition Type Liquid Crystals | | |
|---|---|---|---|
| | No. 1 | No. 2 | No. 3 |
| Composition | | | |
| nematic liquid crystal (% by weight) | 90 | 87 | 83 |
| chiral nematic liquid crystal (% by weight) | 10 | 13 | 17 |
| Refractive Index | | | |
| average refractive index $n_0$ | 1.509 | 1.510 | 1.510 |
| refractive index anisotropy $\Delta_n$ | 0.157 | 0.150 | 0.146 |
| Spiral Pitch (μm) | 1.10 | 0.84 | 0.78 |

Note
The measurement temperature was 25° C. and $\Delta_n$ was measured by an Abbe refractometer having a sample stand with a rubbed surface.

TABLE 2

| Liquid Crystals | Displayed Colors (cell thickness, μm) | | |
|---|---|---|---|
| No. 1 | bluish violet (4.5) | blue (5.7) | cyan (6.7) |
| No. 2 | reddish violet (4.5) | violet (5.7) | blue (6.7) |
| No. 3 | orange (4.5) | thin russet (5.8) | violet (6.8) |

Multi-Color Display by Laminated Display Panel

A panel having a display capacity of 80×120 dots (80×120 mm) was fabricated into a laminate structure as shown in FIG. 3. Liquid crystals No. 1 and No. 3 were filled into cells having a thickness of 6 μm. Namely, the panel comprised glass substrates 11, electrodes 12, and cells having a liquid crystal 13 (or a liquid crystal 14) sealed therein. In the present embodiment, the panel comprised two liquid crystal layers 13 and 14. Note, reference numeral 15 represents a sealant.

An example of the projection-type color liquid crystal device, in which a liquid crystal display panel A including a plurality of liquid crystal layers is built as described above, is illustrated in FIG. 2.

As is apparent from FIG. 2, in the liquid crystal display device of the present invention, the liquid crystal display panel A comprising a plurality of liquid crystal layers is located between the image-forming lens 5 and the light source 1.

A projection-type display was performed on a white screen 7 by using this display device. It was confirmed that since light from the light source 1 (for example, a 650 W halogen lamp) passed through the liquid crystal display panel A having liquid crystal layers having different cell thicknesses and/or anisotropy of the refractive index, lights having different wavelengths were selectively scattered, and non-scattering lights having different wavelengths passed through the image-forming lens 5 and were focused on the screen 7. In short, four colors, that is, the colors of blue, russet, black and white (background) were displayed.

Display with OHP

Transparent electrodes are formed on glass plates having a thickness of 1.1 mm, between which a liquid crystal was filled and sealed, to form two liquid crystal display panels. One panel was for a red display and the other for a green display. There were 640×400 image elements, at a pitch of 0.35 mm. The thickness of the cells and the characteristics of the liquid crystals are shown in Table 3.

TABLE 3

| | Panel for Red | Panel for Green |
|---|---|---|
| Cell thickness | 5.7 μm | 5.7 μm |
| Spiral pitch | 0.78 μm | 0.90 μm |
| $\Delta_n$ | 0.146 | 0.216 |

The electrodes were extended outside by a heat compaction bonding type flexible cable, and the two panels were matched and bonded with a transparent epoxy resin. A concave Fresnel lens having a focal length of 360 mm was arranged on the lower side of the laminated panels, and a convex Fresnel lens having a focal length of 355 mm was arranged on the upper side of the laminated panels. These lenses were not adhered to the panels.

The thus-assembled unit was placed on a commercial OHP (Fuji Shashin Kohki Co., Fujix EW-1) and display was performed by driving the panels. The magnitude of enlargement of the projection display was about 7.

The deviation of the image elements was less than half of an image element, throughout the projected image, and substantially no difference in color could be seen between the central and peripheral portions.

We claim:

1. A projection-type liquid crystal multi-color display device, comprising:
   a liquid crystal panel having a plurality of layers of cholesteric-nematic phase transition type liquid crystals having a positive dielectric anisotropy and a refractive index anisotropy, each of the layers having a layer thickness, the liquid crystals being in, depending on an applied electrical voltage history, either a homeotropic or focalconic texture when a certain electrical voltage is applied to the liquid crystal layer, the liquid crystal layers forming an image composed of homeotropic and focalconic textures by selectively applying different electrical voltage histories and then maintaining said certain electrical voltage at the liquid crystal layer, the refractive index anisotropy of the liquid crystal and the layer thickness of each of the liquid crystal layers being selected so that a light transmitted through each liquid crystal layer is brought to a desired color if a light is incident normal to each liquid crystal layer at a portion thereof in the focalconic texture, while a portion of the liquid crystal layers in the homeotropic texture is transparent and a light transmitted there is not colored; and an optical system for making a light incident almost normal to the liquid crystal panel and forming a projected image of the image of the homeotropic and focalconic textures in the liquid crystal panel on a screen, thereby coloring a light which has been transmitted through a focalconic texture portion of the liquid crystal layers so that the projected image is made a multi-color image.

2. A device according to claim 1, wherein the liquid crystal comprises a nematic liquid crystal and a chiral nematic liquid crystal.

3. A device according to claim 1, wherein the optical system comprises a light source, a first convex Fresnel lens for converting a light from the light source to a parallel light incident normal to the liquid crystal panel, a second convex Fresnel lens for condensing the parallel light transmitting through the liquid crystal panel toward an image-forming lens, and the image-forming lens for forming an image from the light transmitted through the liquid crystal panel and condensed toward the image-forming lens.

4. A device according to claim 1, wherein the optical system comprises a concave Fresnel lens for converting a convergent light to a parallel light incident normal to the liquid crystal panel and a convex Fresnel lens for condensing the parallel light transmitted through the liquid crystal panel, the device being connectable to an overhead projector which uses a convergent light to transmit an image of an original placed in the overhead projector and to form a projected image on a screen.

5. A device according to claim 1, wherein the thickness of the liquid crystal layer is 15 $\mu$m or less.

6. A device according to claim 1, wherein the thickness of the liquid crystal layer is 10 $\mu$m or less.

7. A device according to claim 2, wherein the cholesteric liquid crystal has a spiral pitch of 0.5 to 2 $\mu$m.

8. A device according to claim 4, further comprising the overhead projector.

* * * * *